United States Patent
Jin et al.

(10) Patent No.: US 10,770,063 B2
(45) Date of Patent: Sep. 8, 2020

(54) REAL-TIME SPEAKER-DEPENDENT NEURAL VOCODER

(71) Applicants: Adobe Inc., San Jose, CA (US); The Trustees of Princeton University, Princeton, NJ (US)

(72) Inventors: Zeyu Jin, Princeton, NJ (US); Gautham J. Mysore, San Francisco, CA (US); Jingwan Lu, Santa Clara, CA (US); Adam Finkelstein, Princeton, NJ (US)

(73) Assignees: Adobe Inc., San Jose, CA (US); The Trustees of Princeton University, Princeton, NJ (US)

( * ) Notice: Subject to any disclaimer, the term of this patent is extended or adjusted under 35 U.S.C. 154(b) by 205 days.

(21) Appl. No.: 16/108,996

(22) Filed: Aug. 22, 2018

(65) Prior Publication Data

US 2019/0318726 A1    Oct. 17, 2019

Related U.S. Application Data

(60) Provisional application No. 62/657,472, filed on Apr. 13, 2018.

(51) Int. Cl.
| | |
|---|---|
| *G10L 15/16* | (2006.01) |
| *G06F 17/14* | (2006.01) |
| *G10L 15/22* | (2006.01) |
| *G06N 3/08* | (2006.01) |
| *G06N 3/04* | (2006.01) |

(52) U.S. Cl.
CPC ............ *G10L 15/16* (2013.01); *G06F 17/142* (2013.01); *G06N 3/04* (2013.01); *G06N 3/08* (2013.01); *G10L 15/22* (2013.01)

(58) Field of Classification Search
CPC ................................ G10L 13/08; G10L 25/30
See application file for complete search history.

(56) References Cited

U.S. PATENT DOCUMENTS

| | | | |
|---|---|---|---|
| 5,490,234 | A | 2/1996 | Narayan |
| 5,649,060 | A | 7/1997 | Ellozy et al. |
| 5,740,320 | A | 4/1998 | Itoh et al. |
| 6,151,576 | A | 11/2000 | Warnock et al. |
| 7,623,755 | B2 | 11/2009 | Kuspa |
| 7,689,421 | B2 | 3/2010 | Li et al. |
| 7,853,452 | B2 | 12/2010 | Gleason et al. |
| 7,869,892 | B2 | 1/2011 | Foust et al. |
| 7,870,488 | B2 | 1/2011 | Kirkpatrick |

(Continued)

OTHER PUBLICATIONS

Lu et al., "HelpingHand: Example-based Stroke Stylization", ACM Trans. on Graph., vol. 31, No. 4, article 46 (Jul. 2012).

(Continued)

*Primary Examiner* — Matthew H Baker
(74) *Attorney, Agent, or Firm* — Finch & Maloney PLLC

(57) ABSTRACT

Techniques for a recursive deep-learning approach for performing speech synthesis using a repeatable structure that splits an input tensor into a left half and right half similar to the operation of the Fast Fourier Transform, performs a 1-D convolution on each respective half, performs a summation and then applies a post-processing function. The repeatable structure may be utilized in a series configuration to operate as a vocoder or perform other speech processing functions.

17 Claims, 8 Drawing Sheets

(56) References Cited

U.S. PATENT DOCUMENTS

| | | | |
|---|---|---|---|
| 8,620,654 | B2 | 12/2013 | Khouri et al. |
| 8,862,472 | B2 | 10/2014 | Wilfart et al. |
| 2004/0260550 | A1* | 12/2004 | Burges .................... G10L 17/00 704/259 |
| 2009/0070115 | A1 | 3/2009 | Tachibana et al. |
| 2013/0205207 | A1 | 8/2013 | Asch et al. |
| 2017/0140260 | A1* | 5/2017 | Manning ................ G10L 25/30 |
| 2018/0075343 | A1* | 3/2018 | van den Oord ....... G10L 13/086 |
| 2018/0247636 | A1* | 8/2018 | Arik ...................... G10L 13/027 |
| 2018/0261214 | A1* | 9/2018 | Gehring ................. G10L 15/16 |
| 2018/0261236 | A1* | 9/2018 | Cao ....................... G10L 15/063 |
| 2018/0329897 | A1* | 11/2018 | Kalchbrenner ........ G06N 3/084 |
| 2018/0336880 | A1* | 11/2018 | Arik ...................... G10L 15/063 |
| 2018/0358003 | A1* | 12/2018 | Calle ...................... G10L 21/02 |
| 2019/0122651 | A1* | 4/2019 | Arik ...................... G10L 13/027 |
| 2019/0251952 | A1* | 8/2019 | Arik ...................... G10L 13/033 |
| 2019/0325889 | A1* | 10/2019 | Li ........................ G10L 21/0232 |
| 2020/0082817 | A1* | 3/2020 | Narayanan ............. G10L 25/21 |

OTHER PUBLICATIONS

Lukac et al., "Painting by Feature: Texture Boundaries for Example-based Image Creation", ACM Trans. Graph., vol. 32, No. 4, article 116 (Jul. 2013).
Muda et al., "Voice Recognition Algorithms Using Mel Frequency Cepstral Coefficient (MFCC) and Dynamic Time Warping (DTW) Techniques", Journal of Computing, vol. 2, issue 3, pp. 138-143 (Mar. 2010).
Pavel et al., SceneSkim: Searching and Browsing Movies Using Synchronized Captions, Scripts and Plot Summaries:, In Proceedings of the 28th Annual ACM Symposium on User Interface Software and Technology (UIST 2015), pp. 181-190 (2015).
Pavel et al., "Video Digests: A Browsable, Skimmable Format for Informational Lecture Videos", Proceedings of the 27th Annual ACM Symposium on User Interface Software and Technology (UIST 2014), pp. 573-582 (2014).
Raj et al., "Non-negative matrix factorization based compensation of music for automatic speech recognition", Proceedings of Interspeech, pp. 717-720 (2010).
Roelands et al., "Waveform Similarity Based Overlap-Add (WSOLA) for Time-Scale Modification of Speech: Structures and Evaluation", EUROSPEECH, pp. 337-340 (1993).
Sjolander, "An HMM-based system for automatic segmentation and alignment of speech", PHONUM 9, pp. 93-96 (2003).
Stone et al., "Speaking with Hands: Creating Animated Conversational Characters from Recordings of Human Performance", In AMC SIGGRAPH 2004 Papers, pp. 506-513 (2004).
Stylianou et al., "Continuous probabilistic transform for voice conversion", IEEE Transactions on Speech and Audio Processing, vol. 6, No. 2, pp. 131-142 (Mar. 1998).
Taylor, "Text-to-Speech Synthesis", Table of Contents and Introduction (31 pages), Cambridge University Press (2009).
Toda et al., "Voice Conversion Based on Maximum-Likelihood Estimation of Spectral Parameter Trajectory", IEEE Transactions on Audio, Speech, and Language Processing, vol. 15, pp. 2222-2235 (Nov. 2007).
Toda et al., "One-to-Many and Many-to-One Voice Conversion Based on Eigenvoices", In 1988 International Conference on Acoustics, Speech, and Signal Processing (ICASSP 88), vol. 4, pp. IV-1249-1252, DOI: 10.1109/ICASSP.2007.367303 (May 2007).
Toda et al., "Voice conversion algorithm based on Gaussian mixture model with dynamic frequency warping of STRAIGHT spectrum", In 2001 IEEE International Conference on Acoustics, Speech and Signal Processing (ICASSP), pp. 841-844, DOI: 10.1109/ICASSP. 2001.941046 (2001).
Tokuda et al., "Speech Synthesis Based on Hidden Markov Models", Proceedings of the IEEE, vol. 101, No. 5, pp. 1234-1252, DOI 10.1109/JPROC.2013.2251852 (May 2013).
Whittaker et al., "Semantic Speech Editing", Proceedings of the SIGCHI Conference on Human Factors in Computing Systems (CHI 2004), pp. 527-534, DOI: 10.1145/985692.985759 (2004).
Wu et al., "Exemplar-based unit selection for voice conversion utilizing temporal information", Proc. Interspeech 2013, pp. 3057-3061 (2013).
Arik et al., "Neural Voice Cloning with a Few Samples", in 32nd Conference on Neural Information Processing Systems (NIPS 2018), Montréal, Canada, arXiv:1802.06006v3, 18 pages (Oct. 12, 2018).
Arik et al., "Deep Voice 2: Multi-Speaker Neural Text-to-Speech", in 31st Conference on Neural Information Processing Systems (NIPS 2017), Long Beach, CA, arXiv:1705.08947v2, 15 pages (Sep. 20, 2017).
Black, "Unit selection and emotional speech", Eighth European Conference on Speech Communication and Technology, 4 pages (2003).
Cheveigne et al., "YIN, A fundamental frequency estimator for speech and music", The Journal of the Acoustical Society of America, vol. 111(4), pp. 1917-1930 (Apr. 2002).
Dutoit, "Corpus-Based Speech Synthesis", Chapter 21 in Springer Handbook of Speech Processing, Springer-Verlag Berlin Heidelberg, pp. 437-455 (2008).
Hon et al., "CMU Robust Vocabulary-Independent Speech Recognition System", published in Proceedings of ICASSP '91: 1991 International Conference on Acoustics, Speech, and Signal Processing, pp. 889-892 (1991).
Jin et al., "FFTNET: A real-time speaker-dependent neural vocoder", published in 2018 IEEE International Conference on Acoustics, Speech and Signal Processing (ICASSP), 5 pages (2018).
Kawahara et al., "Restructuring speech representations using a pitch-adaptive time-frequency smoothing and an instantaneous-frequency-based F0 extraction: Possible role of a repetitive structure in sounds", Speech Communication, vol. 27, pp. 187-207 (1999).
Kawai et al., "XIMERA: A new TTS from ATR based on corpus-based technologies", in Fifth ISCA Speech Synthesis Workshop, pp. 179-184 (Jun. 14-16, 2004).
Kishore et al., "Unit size in unit selection speech synthesis", in Proceedings of the Eurospeech 2003, Geneva, Switzerland, pp. 1317-1320 (2003).
Lorenzo-Trueba et al., "The voice conversion challenge 2018: Promoting development of parallel and nonparallel methods", Odyssey 2018: The Speaker and Language Recognition Workshop, Les Sables d'Olonne, France, arXiv:1804.04262, 10 pages (2018).
Luong et al., "Effective approaches to attention-based neural machine translation", in Proceedings of the 2015 Conference on Empirical Methods in Natural Language Processing, arXiv:1508.04025v5, 11 pages (Sep. 2015).
Mason et al., "Conducting behavioral research on Amazon's Mechanical Turk", Behavior Research Methods, vol. 44(1), pp. 1-23 (2012).
Merritt et al., "Deep neural network-guided unit selection synthesis", in 2016 IEEE International Conference on Acoustics, Speech and Signal Processing (ICASSP), pp. 5145-5149 (2016).
Niwa et al., "Statistical voice conversion based on WaveNet", in Proceedings of the 2018 IEEE International Conference on Acoustics, Speech and Signal Processing (ICASSP), pp. 5289-5293 (2018).
Okubo et al., "Hybrid voice conversion of unit selection and generation using prosody dependent HMM", in IEICE Transactions on Information and Systems, vol. E89-D, pp. 2775-2782 (Nov. 2006).
Park et al., "Narrowband to wideband conversion of speech using GMM based transformation", in IEEE International Conference on Acoustics, Speech and Signal Processing (ICASSP 2000), vol. 3, pp. 1843-1846 (2000).
Patil et al., "A syllable-based framework for unit selection synthesis in 13 Indian languages", in 2013 International Conference Oriental COCOSDA held jointly with 2013 Conference on Asian Spoken Language Research and Evaluation (O-COCOSDA/CASLRE), Gurgaon, pp. 1-8 (Nov. 2013).
Kim et al., "Two-band excitation for hmm-based speech synthesis", in IEICE Transactions on Information and Systems, vol. E90-D, pp. 378-381 (Jan. 2007).

(56) References Cited

OTHER PUBLICATIONS

Schröder, "Expressive speech synthesis: Past, present, and possible futures", in Affective Information Processing, Springer London, pp. 111-126 (2009).

Shen et al., "Natural TTS synthesis by conditioning WaveNet on MEL spectrogram predictions", in 2018 IEEE International Conference on Acoustics, Speech and Signal Processing (ICASSP), arXiv:1712.05884v2, 5 pages (Feb. 16, 2017).

Stylianou, "Voice transformation: A survey", in IEEE International Conference on Acoustics, Speech and Signal Processing (ICASSP 2009), pp. 3585-3588 (2009).

Sun et al., "Phonetic posteriorgrams for many-to-one voice conversion without parallel data training", in 2016 IEEE International Conference on Multimedia and Expo (ICME), pp. 1-6 (2016).

Sündermann et al., "Text-independent voice conversion based on unit selection", in IEEE International Conference on Acoustics, Speech and Signal Processing (ICASSP 2006), pp. 81-84 (May 2006).

Sutskever et al., "Sequence to sequence learning with neural networks", in Proceedings of the 27th International Conference on Neural Information Processing Systems, arXiv:1409.3215v3, 9 pages (Dec. 14, 2014).

Tachibana et al., "Speaker and style adaptation using average voice model for style control in hmm-based speech synthesis", in 2008 IEEE International Conference on Acoustics, Speech and Signal Processing, pp. 4633-4636 (2008).

Takamichi et al., "Modulation spectrum-constrained trajectory training algorithm for GMM-based voice conversion", in IEEE International Conference on Acoustics, Speech and Signal Processing (ICASSP 2015), pp. 4859-4863 (2015).

Nose et al., "A style control technique for HMM-based expressive speech synthesis", IEICE Transactions on Information and Systems, vol. E90-D, pp. 1406-1413 (Sep. 2007).

Tan et al., "Gated residual networks with dilated convolutions for supervised speech separation", in 2018 IEEE International Conference on Acoustics, Speech and Signal Processing (ICASSP), pp. 21-25 (2018).

Tokuda et al., "Speech parameter generation algorithms for HMM-based speech synthesis", in 2000 IEEE International Conference on Acoustics, Speech, and Signal Processing (Cat. No. 00CH37100), Istanbul, Turkey, vol. 3, pp. 1315-1318 (2000).

Tokuda et al., "Mel-generalized cepstral analysis—A unified approach to speech spectral estimation", in the 3rd International Conference on Spoken Language Processing (ICSLP 1994), Yokohama, Japan, 4 pages (1994).

Wang et al., "An RNN-based quantized F0 model with multi-tier feedback links for text-to-speech synthesis", in Proceedings of Interspeech 2017, pp. 1059-1063 (2017).

Wu et al., "Deep neural networks employing multi-task learning and stacked bottleneck features for speech synthesis", in 2015 IEEE International Conference on Acoustics, Speech and Signal Processing (ICASSP), pp. 4460-4464 (2015).

Yamagishi et al., "Analysis of speaker adaptation algorithms for HMM-based speech synthesis and a constrained SMAPLR adaptation algorithm", IEEE Transactions on Audio, Speech, and Language Processing, vol. 17(1), pp. 66-83 (2009).

Yoshimura et al., "Simultaneous modeling of spectrum, pitch and duration in HMM-based speech synthesis", Eurospeech, 4 pages (1999).

Zen et al., "Statistical parametric speech synthesis using deep neural networks", in 2013 IEEE International Conference on Acoustics, Speech and Signal Processing, pp. 7962-7966 (2013).

Black et al., "Automatically clustering similar units for unit selection in speech synthesis", Proceedings of the Eurospeech 1997, Rhodes, Greece, 4 pages (1997).

Masoodian et al., "TRAED: Speech Audio Editing using Imperfect Transcripts", 2006 12th International Multi-Media Modeling Conference, IEEE 2006, 6 pages.

Notice of Allowance received in U.S. Appl. No. 15/796,292 (9 pages) (sent Apr. 8, 2019).

Van Den Oord et al., "WaveNet: A Generative Model for Raw Audio", arXiv:1609.03499v2, https://arxiv.org/abs/1609.03499 (Sep. 19, 2016).

Dutoit, "A Short Introduction to Text-to-Speech Synthesis", http://www.tcts.fpms.ac.be/synthesis/introtts_old.html (Dec. 17, 1999).

Wang et al., "Tacotron: A Fully End-to-End Text-to-Speech Synthesis Model", arXiv:1703.10135v1 https://arxiv.org/abs/1703.10135v1 (Mar. 29, 2017).

Sotelo et al., "Char2Wav: End-to-End Speech Synthesis", International Conference on Learning Representations 2017 Workshop Submission (2017).

Ramos, "Voice Conversion with Deep Learning". Técnico Lisboa Master's Thesis https://fenix.tecnico.ulisboa.pt/downloadFile/1689244997257288/thesis.pdf (Oct. 2016).

kobayashi et al., "Statistical voice conversion with WaveNet-based waveform generation", Proc. Interspeech 2017, pp. 1138-1142, DOI: 10.21437/Interspeech.2017-986, pp. 1138-1142 (Aug. 2017).

Rethage et al., "A Wavenet for Speech Denoising", arXiv:1706.07162v1 https://arxiv.org/abs/1706.07162 (Jun. 22, 2017).

Engel et al., "Neural Audio Synthesis of Musical Notes with WaveNet Autoencoders", arXiv:1704.01279v1, https://arxiv.org/abs/1704.01279 (Apr. 5, 2017).

Tamamori et al., "Speaker-dependent WaveNet vocoder", Proc. Interspeech 2017, pp. 1118-1122, DOI: 10.21437/Interspeech.2017-314 (Aug. 2017).

Dudley et al., "The Vocoder—Electrical Re-Creation of Speech", Journal of the Society of Motion Picture Engineers, vol. 34, issue 3, pp. 272-278 (Mar. 1940).

Black et al., "Statistical Parametric Speech Synthesis", 2007 IEEE International Conference on Acoustics, Speech end Signal Processing (ICASSP '07), pp. 1229-1232 (Apr. 2007).

Imai et al., "Mel Log Spectrum Approximation (MLSA) fitter for speech synthesis", Electronics and Communications in Japan (Part I: Communications) vol. 66, issue 2, pp. 10-18 (1983).

Le Paine et al., "Fast Wavenet Generation Algorithm", arXiv:1611.09482v1 https://arxiv.org/abs/1611.09482 (Nov. 29, 2016).

Arik et al., "Deep Voice: Real-time Neural Text-to-Speech", arXiv:1702.07825v2, https://arxiv.org/abs/1702.07825 (Mar. 7, 2017).

Cooley et al., "An algorithm for the machine calculation of complex fourier series," Mathematics of Computation, vol. 19, No. 90, pp. 297-301 (1965).

Machado et al., "Voice conversion: A critical survey", Proc. Sound and Music Computing, pp. 291-298 (2010).

Van Den Oord et al., "Conditional Image Generation with PixelCNN Decoders", arXiv:1606.05328v2 https://arxiv.org/abs/1606.05328 (Jun. 18, 2016).

Loizou, Summary of "Speech Enhancement: Theory and Practice, Second Edition", retrieved from https://www.crcpress.com/Speech-Enhancement-Theory-and-Practice-Second-Edition/Loizou/p/book/9781138075573 (published Mar. 31, 2017).

Kominek et al., "The CMU Arctic speech databases", 5th ISCA Speech Synthesis Workshop, Pittsburgh, PA, pp. 223-224 (2004).

Kingma et al., "Adam: A Method for Stochastic Optimization", arXiv:1412.6980v9 https://arxiv.org/abs/1412.6980 (Jan. 30, 2017).

Buhrmester et al., "Amazon's Mechanical Turk: A New Source of Inexpensive, Yet High-Quality, Data?", Perspectives on Psychological Science, vol. 6, issue 1, pp. 3-5 (2011).

McGraw, Summary of Chapter 3 in "Crowdsourcing for Speech Processing: Applications to Data Collection, Transcription and Assessment", retrieved from https://onlinelibrary.wiley.com/doi/abs/10.1002/9781118541241.ch3 (published Mar. 8, 2013).

Jin et al., "CUTE: A Concatenative Method for Voice Conversion Using Exemplar-based Unit Selection", The 41st IEEE International Conference on Acoustics, Speech and Signal Processing (ICASSP), 5 pages (Mar. 2016).

Jin et al., "VoCo: Text-based Insertion and Replacement in Audio Narration", ACM Transactions on Graphics, vol. 36, No. 4, article 96, pp. 96:1-96:13 (Jul. 2017).

Cartwright et al., "Fast and easy crowdsourced perceptual audio evaluation", 2016 IEEE International Conference on Acoustics, Speech and Signal Processing Proceedings, pp. 619-623 (May 2016).

(56) References Cited

OTHER PUBLICATIONS

Parson et al., "Evaluating voice quality and speech synthesis using crowdsourcing", International Conference on Text, Speech and Dialogue, vol. 8082, pp. 233-240 (2013).

Loizou, Table of Contents for "Speech Enhancement: Theory and Practice, Second Edition", retrieved from http://www.gbv.de/dms/tib-ub-hannover/755610113.pdf (published Mar. 31, 2017).

Van Den Oord et al., "Parallel WaveNet: Fast High-Fidelity Speech Synthesis", arXiv:1711.10433v1, https://arxiv.org/abs/1711.10433, (Nov. 28, 2017).

Anthony, "Adobe demos 'photoshop for audio,' lets you edit speech as easily as text", https://arstechnica.com/information-technology/2016/11/adobe-voco-photoshop-for-audio-speech-editing/ (retrieved Oct. 26, 2017).

Rubin et al., "Content-Based Tools for Editing Audio Stories", UIST 2013—Proceedings of the 26th Annual ACM Symposium on User Interface Software and Technology, DOI: 10.1145/2501988.2501993 (Oct. 2013).

U.S. Appl. No. 15/796,292, "Text-Based Insertion and Replacement in Audio Narration", (filed Oct. 27, 2017).

Acapela Group R&D, https://www.acapela-group.com/about-us/rd/ (retrieved Nov. 19, 2018).

Aihara et al., "Voice conversion based on non-negative matrix factorization using phoneme-categorized dictionary", In 2014 IEEE International Conference on Acoustics, Speech and Signal Processing (ICASSP), pp. 7944-7948 (2014).

Berthouzoz et al., "Tools for placing cuts and transitions in interview video", ACM Transactions on Graphics (TOG), vol. 31, issue 4, article 67 (Jul. 2012).

Boersma, "PRAAT, a system for doing phonetics by computer", Glot International, vol. 5, No. 9/10, pp. 341-347 (Nov./Dec. 2001).

Bregler, et al., "Video Rewrite: Driving Visual Speech with Audio", In Proceedings of the 24th Annual Conference on Computer Graphics and Interactive Techniques (SIGGRAPH '97), pp. 353-360 (1997).

Casares et al., "Simplifying video editing using metadata", In Proceedings of the 4th Conference on Designing Interactive Systems: Processes, Practices, Methods, and Techniques (DIS '02), pp. 157-166 (2002).

Chen et al., "Voice conversion using deep neural networks with layer-wise generative training", IEEE/ACM Transactions on Audio, Speech, and Language Processing, vol. 22, No. 12, pp. 1859-1872 (Dec. 2014).

Conkie et al., "Optimal coupling of diphones", Second ESCA/IEEE Workshop on Speech Synthesis, pp. 119-122 (Sep. 1994).

Desai et al., "Voice conversion using Artificial Neural Networks", In Proceedings of the 2009 IEEE International Conference on Acoustics, Speech and Signal Processing (ICASSP 2009), pp. 3893-3896 (2009).

Dutoit et al., "Towards a Voice Conversion System Based on Frame Selection", In 1988 International Conference on Acoustics, Speech and Signal Processing (ICASSP-88), vol. 4, pp. IV-513-516 (May 2007).

Forney, Jr., "The Viterbi Algorithm", Proceedings of the IEEE, vol. 61, No. 3, pp. 268-278 (Mar. 1973).

Fujii et al., "High-Individuality Voice Conversion Based on Concatenative Speech Synthesis", International Journal of Electrical and Computer Engineering, vol. 1, No. 11, pp. 1625-1630 (2007).

Germain et al., "Equalization Matching of Speech Recordings in Real-World Environments", In 2016 IEEE International Conference on Acoustics, Speech and Signal Processing (ICASSP), DOI: 10.1109/ICASSP.2016.7471747 (Mar. 2016).

Hertzmann et al., "Image Analogies", In Proceedings of the 28th Annual Conference on Computer Graphics and Interactive Techniques (SIGGRAPH '01), pp. 327-340 (2001).

Hunt et al., "Unit selection in a concatenative speech synthesis system using a large speech database", 1996 IEEE International Conference on Acoustics, Speech, and Signal Processing Conference Proceedings, pp. 373-376, DOI: 10.1109/ICASSP.1996.541110 (May 1996).

Kain et al., "Spectral voice conversion for text-to-speech synthesis", In Proceedings of the 1998 IEEE International Conferenoe on Acoustics, Speech and Signal Processing (ICASSP '98), pp. 285-288, DOI: 10.1109/ICASSP.1998.674423 (May 1998).

Kawahara et al., "TANDEM-STRAIGHT: A temporally stable power spectral representation for periodic signals and applications to interference-free spectrum, F0, and aperiodicity estimation", In 2008 IEEE International Conference on Acoustics, Speech and Signal Processing (ICASSP 2008), pp. 3933-3936 (2008).

Kubichek, "Mel-cepstral distance measure for objective speech quality assessment", In Proceedings of IEEE Pacific Rim Conference on Communications Computers and Signal Processing, DOI: 10.1109/PACRIM.1993.407206 (May 1993).

Levine et al., "Real-time Prosody-driven Synthesis of Body Language", ACM Trans. Graph., vol. 28, No. 5, article 172 (Dec. 2009).

\* cited by examiner

REAL-TIME SPEAKER-DEPENDENT NEURAL VOCODER

FIELD OF THE DISCLOSURE

This disclosure relates to techniques for performing real-time speech synthesis. In particular, this disclosure relates to for performing real-time speech synthesis in the voice of a particular person.

BACKGROUND

Synthesizing realistic sound human speech in real-time based upon linguistic features and F0 is a challenging problem. The application of deep learning to speech synthesis such as the WaveNet project has produced promising results. Deep-learning approaches to speech synthesis such as WaveNet have many applications, including the classical text-to-speech ("TTS") problem. While initially WaveNet and others addressed TTS starting from linguistic features, ensuing work showed that speech could be synthesized directly from input text. The approach has also been adapted to other problems, including voice conversion, speech enhancement, and musical instrument synthesis.

Despite the impressive quality of the synthesized waveform, deep learning techniques such as WaveNet still suffer from several drawbacks. In particular, these approaches require substantial training corpus (roughly 30 hours), the synthesis process is slow (about 40 minutes to produce a second of audio), and the result contains audible noise.

More recent work showed that WaveNet could also be used as a vocoder, which generates a waveform from acoustic features, rather than linguistic features. Working from acoustic features, the training process is effective with a substantially smaller corpus (roughly one hour) while still producing higher quality speech than baseline vocoders like mel-log spectrum approximation (MLSA). Several research efforts have addressed the problem of computational cost including algorithmic improvements for the same architecture called Fast WaveNet, which can synthesize a second of audio in roughly a minute. Other efforts have been able to achieve real-time synthesis by reducing the WaveNet model size significantly, but at the expense of noticeably worse voice quality. Other efforts have facilitated parallelization of WaveNet for GPU computing allowing real-time operation with some GPU clusters. However, this method does not reduce actual computational costs, but instead demands a far costlier hardware solution.

In general, deep-learning techniques for performing speech synthesis such as WaveNet suffer from significant drawbacks, namely requiring a large training corpus and having slow synthesis time, and therefore new approaches are necessary. Further, known methods such as the WaveNet model suffer from high computational complexity due to the employment of a dilated convolution and gated filter structure. Thus, deep-learning techniques for performing speech synthesis achieving a large receptive field for correlating audio samples far in the past with a current input sample that do not impose significant computational penalties are required.

DETAILED DESCRIPTION

Figure 1:
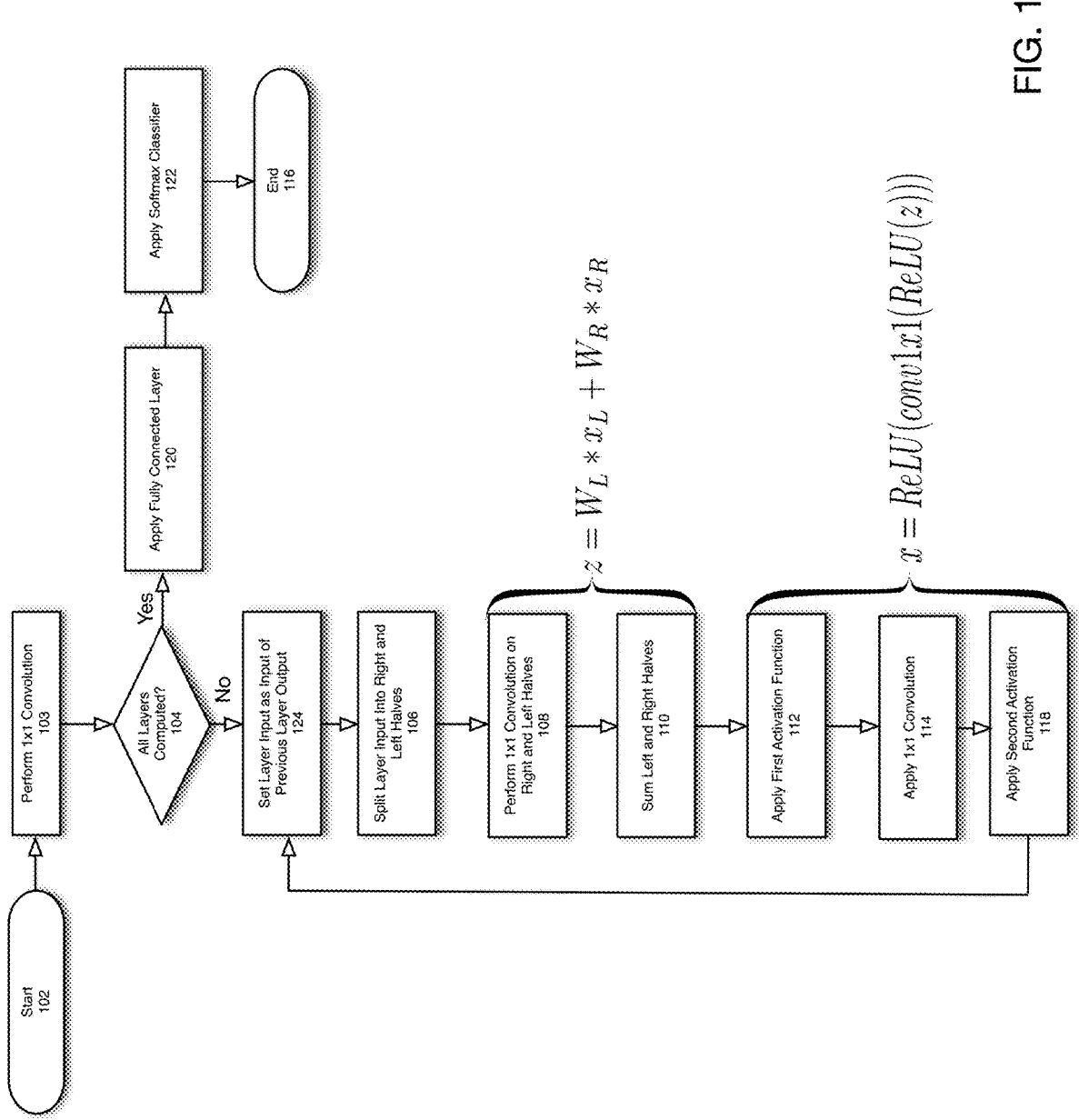
FIG. 1 is a flowchart depicting a feedforward operation of a Fast Fourier Transform neural network (generally referred to herein as FFTNet) according to one embodiment of the present disclosure.

The present disclosure describes a deep-learning approach for performing speech synthesis herein referred to as a Fast Fourier Transform ("FFT") neural network, or "FFTNet" for short. According to one embodiment of the present disclosure, FFTNet may be employed as a synthesizer that transforms audio features to a speech audio signal. The audio features may be inferred from other processes. For example, FFTNet may be used to synthesize speech audio with high quality.

FFTNet may also be employed to perform signal compression. Because speech may be synthesized from low-dimensional features, it is possible to transmit the audio features instead of the signal for audio transmission. Thus, for example, 10 kbps audio features may be transmitted to a receiver where they are decoded using FFTNet, which achieves better perceptual quality than 32 kbps MP3.

According to one embodiment of the present disclosure, an FFTNet may be trained using backpropagation and gradient descent. In particular, according to one embodiment of the present disclosure training sets may be generated using audio samples of the same speaker. Then, acoustic features such as F0 and MCC may be extracted and interpolated to match the audio samples.

FFTNet, provides an alternative deep learning architecture, coupled with several improved techniques for training and synthesis. In contrast to conventional approaches that down-sample audio via dilated convolution in a process that resembles wavelet analysis, the FFTNet architecture resembles a classical FFT, and achieves far greater computational efficiency and uses substantially fewer parameters than the WaveNet model. According to one embodiment of the present disclosure, a deep-learning speech synthesis technique is performed utilizing a recursive algorithm that splits each successive input by a factor of 2. A 1×1 convolution is applied to each ½ of the input block whereupon the convolved portions are summed. The model architecture of FFTNet substantially reduces the computational complexity of known deep-learning speech synthesis methods such as WaveNet that rely upon a dilated convolution and gated filter structure. According to one such embodiment, the recursive structure of the FFT is utilized. Further, the FFT kernel $e^{i2\pi kn/N}$ is replaced with a small network structure that learns a non-linear transformation and employs a 1×1 convolution.

In other words, the FFT may be understood as performing a linear transformation with respect to each point due to the multiplication of each time point by the FFT kernel. According to one such embodiment, the FFT kernel is replaced by a 1×1 convolution and a non-linear network herein referred to as a post-processing block. By utilizing the FFT kernel with a small network structure as described herein, the computational complexity of the WaveNet model, which requires a gated filter structure, skip layers and other architectural details is significantly reduced. This allows, for example, the generation of speech synthesis in real-time or near real-time.

According to some such embodiments, FFTNet models produce audio more quickly (>70× faster) than the Fast WaveNet formulation thereby enabling real-time synthesis applications. Moreover, when used as a vocoder, FFTNet produces higher quality synthetic voices, as measured by a "mean opinion score" test than conventional approaches. The FFTNet training and synthesis techniques can improve the original WaveNet approach such that the quality of the synthesized voice is on par with that of the FFTNet architecture (albeit much slower to synthesize). The FFTNet architecture may also be leveraged in a variety of other deep learning problems such as classification tasks and autoencoders. Numerous other embodiments and variations will be appreciated in light of this disclosure.

General Overview

Existing techniques for speech synthesis using deep learning such as WaveNet model the probability of a speech waveform as follows:

$$p(x) = \prod_{t=1}^{T} p(x_t | x_1, \ldots, x_{t-1})$$

That is, the joint probability of a waveform $x=\{x_1, \ldots, x_T\}$ is factorized as a product of conditional probabilities as shown above. Each audio speech sample $x_t$ is conditioned on the samples at all previous timesteps. Similar to PixelCNNs, the conditional probability distribution is modeled by a stack of convolutional layers. The model outputs a categorical distribution over the next value $x_t$ with a softmax layer and is optimized to maximize the log-likelihood of the data with respect to the parameters. A dilated causal convolution structure is utilized that allows for a larger receptive field. Further, similar to PixelCNN, in order to simulate the behavior a LSTMs ("Long Short Term Memory") networks, gated activation functions are utilized. Further, residual and skip connections are utilized.

Existing methods such as WaveNet rely upon a dilated convolution structure such that an n-layer network has a receptive field of $2^n$ meaning that as many as $2^n$ previous samples can influence the synthesis of the current sample, which leads to superior synthesis quality. However, with these types of techniques such as WaveNet, only one sample is generated per iteration and thus to generate one second of audio sampled at 16 KHz, the causal dilated network needs to be applied 16,000 times. Faster methods have been proposed, which can produce 200 samples per second, but the performance is still far from real-time on personal computers. With dilated convolution, the nodes that influence the prediction of a new sample may be represented as an inverted binary tree structure. Thus, dilated convolution resembles wavelet analysis in that each filtering step is followed by down-sampling. The causal dilated convolutional structure, gated activation functions and skip connections of known techniques such as WaveNet introduce significant computational complexity.

In contrast, and according to one embodiment of the present disclosure, the recursive structure of the Cooley-Tukey Fast Fourier Transform provides an alternative model for providing the effect of a dilated convolution by increasing the receptive field. A number of benefits flow from using an FFT-based alternative structure, as will be appreciated in light of this disclosure. Given an input sequence $x_1, x_2, \ldots, x_n$, the FFT computes the k-th frequency component $f_k$ from the time-domain series $x_0 \ldots x_{N-1}$ as follows:

$$f_k = \sum_{n=0}^{N-1} x_n e^{-2\pi i n k/N} = \sum_{n=0}^{N/2-1} x_{2n} e^{-2\pi i(2n)k/N} + \sum_{n=0}^{N/2-1} x_{2n+1} e^{-2\pi i(2n+1)k/N} = \text{Denote}$$

$$\sum_{n=0}^{N-1} x_n e^{-2\pi i n k/N} \text{ as } f(n, N)$$

and the above equation can be simplified as:

$$f(n, N) = f\left(2n, \frac{N}{2}\right) + f\left(2n+1, \frac{N}{2}\right) =$$

$$f\left(4n, \frac{N}{4}\right) + f\left(4n+1, \frac{N}{4}\right) f\left(4n+2, \frac{N}{4}\right) + f\left(4n+3, \frac{N}{4}\right) = \ldots$$

According to some such embodiments, $x_n$ may be interpreted as a node with K channels corresponding to quantization levels (e.g., 256 quantization channels). The FFT kernel $e^{-2\pi i(2n)k/N}$ may be interpreted as a transformation function. In this context, each term $$f(n, N) = f\left(2n, \frac{N}{2}\right) + f\left(2n+1, \frac{N}{2}\right)$$

is analogous to applying a transformation to previous nodes $x_{2n}$ and $x_{2n+1}$ and summing up the results. In the classical FFT the FFT kernel operates as a linear transformation on the input samples. According to one embodiment of the present disclosure, the classical FFT kernel is replaced by a small network structure that performs 1×1 convolution in conjunction with a post-processing block that may perform a non-linear transformation.

According to one such embodiment, given an input $x_{0:N}$ defined as the 1D series $(x_0, x_1, \ldots x_{N-1})$ a series of layers or blocks herein referred to as FFTNet blocks, clip or segments the input into two halves (herein referred to as a right half and a left half) as follows:

$(x_L = x_{0:N/2}$ and $x_R = x_{N/2:N})$ and then sums up the results:

$z = W_L * x_L + W_R * x_R$ where $W_L$ and $W_R$ are 1-D convolution weights for $x_L$ and $x_R$. Each FFTNet block further incorporates a non-linear activation function, which may be a ReLU activation function followed by a 1-D convolution to produce inputs for the next layer according to the relation:

$x = \text{ReLU}(\text{conv1×1}(\text{ReLU}(z)))$

Replacing the classical FFT kernel with this FFTNet block achieves the same increase in receptive field as with conventional techniques such as WaveNet, but at the same time, obviates the need for gated activation functions and skip layers, which would otherwise increase the computational complexity.

According to some such embodiments, auxiliary conditions such as linguistic features are transformed by the 1-D convolution and added to z, as follows $$z=(W_L*+W_R*x_R)+(V_L*h_L+V_R*h_R),$$

where $h_L$ and $h_R$ are the two halves of the condition vector h and $V_L$ and $V_R$ are 1-D convolution weights. In some such cases, note that if the condition information is stationary along the time axis the condition information becomes $V*h_N$, instead of $(V_L*h_L+V_R*h_R)$.

Various uses of the FFTNet architecture as provided herein will be apparent. For example, according to one embodiment of the present disclosure an FFTNet may be utilized as a vocoder. In particular, $h_t$ may be F0 (pitch) and MCC ("Mel-Cepstral Coefficient") features at time t. To generate the current sample $x_t$, the previously generated samples $x_{t-N:t}$ and auxiliary condition $h_{t-N+1:t+1}$ (shifted forward by 1) are utilized as the network input. According to one specific example such embodiment, the auxiliary condition is obtained as follows. An analysis window of size 400 is performed every 160 samples. The MCC and F0 features are extracted for each overlapping window. For the $h_t$ corresponding to the window centers, the computed MCC and F0 values (26 dimensions in total) are assigned. For the $h_t$ that are not located at the window centers, linear interpolation is utilized to obtain values based on the assigned $h_t$ in the last step. Numerous other use cases and applications will be appreciated in light of this disclosure, and this disclosure is not intended to be limited to specific details of any such illustrative examples.

According to one further specific example embodiment, and as discussed in more detail below, an FFTNet utilizes a fully connected layer followed by a softmax layer (size 1 with K=256 channels) as the last two layers to produce a posterior distribution of the new sample's quantized values. To determine the final value of the current sample, either an argmax or random sampling may be performed on the posterior distribution.

FFTNet Methodology and Architecture

FIG. 1 is a flowchart depicting an operation of an FFTNet according to one embodiment of the present disclosure. It will be appreciated that the process shown in FIG. 1 may comprise one component of a composite system to perform text-to-speech conversion, voice manipulation, pitch bending, etc. Exemplary embodiments describing the operation of an FFTNet in conjunction with a linguistic features model will be described below.

The process is initiated in 102. In 103, a 1×1 convolution is performed. This 1×1 convolution layer transforms an input (e.g., 256-channel one-hot encoded u-law-quantized signal) into the right number of channels for FFTNet (e.g., 128) before FFTNet operation starts.

As will be described in detail below, according to one embodiment of the present disclosure, an FFTNet may comprise a plurality of layers of a repeatable structure that are successively computed to generate voice output samples. According to one embodiment, the number of layers comprising an FFTNet may be $\log_2(N)$, where N is the size of a tensor dimension for an audio block input. In 104, it is determined whether all layers have been computed. If so ('Yes' branch of 104), in 120 a fully connected layer 250 is applied to the current output. In 122, a softmax classifier is applied to the output of the fully connected layer to generate an output sample. The process ends in 116.

If all layers have not been computed (No' branch of 104), flow continues with 124 whereby the current input is set either to set to the previous layer's output. That is, if this is the first layer, the input is set to the original input to the FFTNet, while if, instead, the current layer is not the first layer, the layer input is set to the previous layer's output. In 106, the layer's input is split evenly into right and left halves. Thus, if the input to the layer is of size N, the left and right halves are of size N/2. In 108, a 1×1 convolution is performed separately on the right and left halves. A method for generating a convolution kernel is described below. In 110, the convolved right and left halves are summed to generate a composite tensor. Thus, after the summing operation, the resulting tensor has a dimension of size N/2.

In 112, a first activation function is applied to the composite tensor. In 114, a 1×1 convolution is applied. In 118, a second activation function is applied. Flow then continues with 124. According to one embodiment of the present disclosure and as discussed in more detail below, the first and second activation functions may be ReLU ("Rectified Linear Unit") functions.

The operation of an FFTNet block or layer will now be described. For purposes of the present discussion the terms FFTNet block and FFTNet layer will be utilized interchangeably. As previously mentioned, each FFTNet block/layer may comprise a repeatable structure that receives an input tensor and generates an output tensor.

According to one embodiment of the present disclosure a skip-layer implementation may be utilized. In this case, according to one embodiment of the present disclosure, the input is summed with the output at each iteration.

Figure 2A:
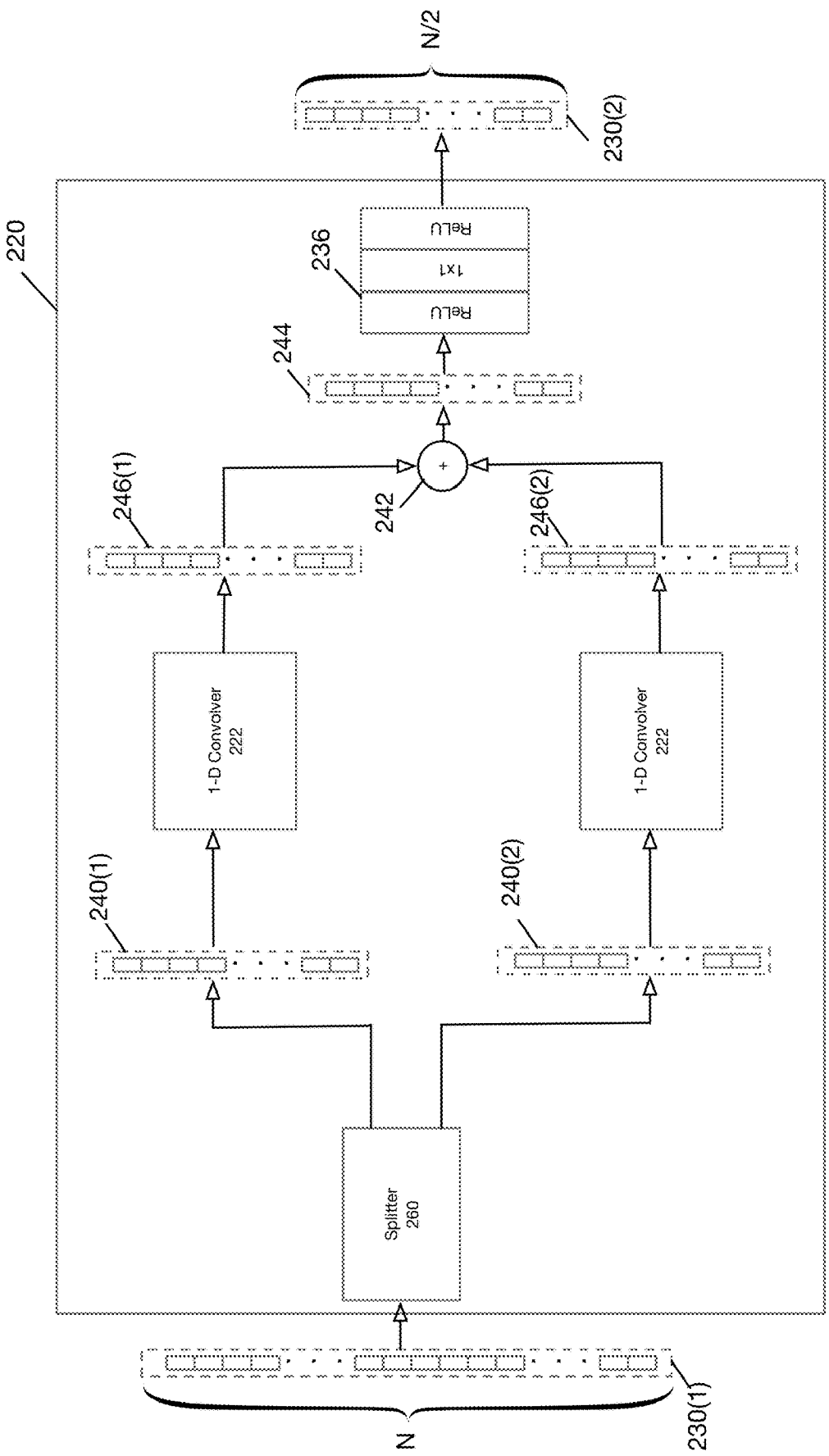
FIG. 2a is a block diagram of an FFTNet block, which may be utilized as part of an FFTNet for performing speech synthesis according to one embodiment of the present disclosure.

FIG. 2a is a block diagram of an FFTNet block, which may be utilized as part of an FFTNet for performing speech processing according to one embodiment of the present disclosure. As will be described with respect to FIGS. 2b-2c, a series of FFTNet blocks 220 may be arranged in a sequential fashion so that the output of one FFTNet block 220 is provided as input to a next FFTNet block. As shown in FIG. 2a, FFTNet block 220 receives input tensor 230(1) and generates output tensor 230(2). As will be appreciated, input tensor 230(1) and output tensor 230(2) may comprise tensor objects as understood in the field of deep learning and deep neural networks. In particular, tensor objects may comprise multidimensional arrays. Example tensor dimensions for input tensor 230(1) and output tensor 230(2) are described below. However, in general, as shown in FIG. 2a, input tensor 230(1) may comprise a tensor with one of its dimension of size N while output tensor 230(2) may comprise a tensor with a corresponding dimension of size N/2. Thus, when FFTNet blocks 220 are arranged in a series as described below with respect to FIGS. 2b-2c, the output of each FFTNet block 220 is a tensor in which one dimension is ½ of the corresponding input dimension. In this fashion, a sequential chain of FFTNet blocks 220 of length log 2(N) where N is the size of the corresponding input dimension will generate a final output of size 1 in the corresponding tensor dimension. In particular, a series of FFTNet blocks 220 may perform a recursive operation as each block comprises a repeatable structure.

As described in detail below, input tensor 230(1) and output tensor 230(2) may also comprise a first dimension that encodes the value of audio samples in a quantized fashion. This quantized dimension is referred to as "channels", which is a term well understood in the context of deep neural networks. In particular, in the context of image data, the channels typically encode the red, blue and green components of a pixel, and therefore there are typically 3 channels, which may vary across a convolutional neural network structure. In the context of the present disclosure, however, the channels encode the quantization level of an audio sample. In particular, according to one embodiment of the present disclosure, the values of input tensor 230(1) may be quantized into an arbitrary number of bins (e.g., 256). In this case, input tensor 230(1) and output tensor 230(2) may include a channel dimension of size 256. According to one embodiment of the present disclosure, the input data (real value audio samples) is quantized into a particular number of channels. The channel size may then be reduced to accommodate the number of channels used in the FFTNET using a 1×1 convolutional layer.

For example, assume the input data audio samples is of size [8000, 1]. The audio samples may be quantized using u-law to obtain quantized audio samples with size [8000, 256], for example. Suppose for purposes of this example that the FFTNet utilizes 128 channels instead of 256. In order to accommodate the 128 channels, a 1×1 convolutional layer may be utilized to transform the 256-channel audio samples into 128-channel audio samples with a resulting data size of [8000, 12]. In this example, the kernel dimension for the 1×1 convolution is [1, 1,256, 128] with the first two dimensions the convolution size (1×1) and the last two a fully connected network that transforms 256 channels into 128 channels.

A second tensor dimension encoded in input tensor 230(1) comprises a block size, which is an even number. For purposes of the present discussion, this dimension will be referred to as the block size dimension. In particular, because, as will be described below, each FFTNet block divides its input tensor 230(1) into a left and right half and generates an output tensor 230(2) having a block size dimension that is ½ the size of the block size dimension of input tensor 230(1), it must be an even number.

The operation of an FFTNet block 220 will now be described. Referring now to the operation of FFTNet block 220, input tensor 230(1) is received by splitter 260, which splits input tensor 230(1) into a left input tensor 240(1) and a right input tensor 240(2) with respect to one of its tensor dimensions. Left input tensor 240(1) and right input tensor 240(2) are then provided to respective 1-D convolvers 222, which respectively perform convolution on left input tensor 240(1) and right input tensor 240(2) to generate respective left convolved tensor 246(1) and right convolved tensor 246(2). Although FIG. 2a shows two separate 1-D convolvers 222, it will be understood that according to alternative embodiments, a single convolver 22 may be utilized to perform convolution of left input tensor 240(1) and right input tensor 240(2). Left convolved tensor 246(1) and right convolved tensor 246(2) are then provided to summer 242, where they are summed to generate summer composite tensor 244. In particular, according to one embodiment of the present disclosure, summer 242 performs a standard tensor summation to generate composite tensor 244. Composite tensor 244 is then provided to post-processing block 236, which performs post-processing on composite tensor 244 to generate output tensor 230(2).

According to one embodiment of the present disclosure, post-processing block 236 may further comprise a first ReLU ("Rectified Linear Unit"), 1×1 convolution block and a second ReLU. As will be appreciated, according to one embodiment of the present disclosure, first and second ReLU may implement an activation function according to the following relationship:

$$f(x)=x^+=\max(x,0)$$

According to alternative embodiments, post-processing block 236 may implement any type of activation function(s) including a sigmoid function or tan h function. 1×1 block may perform a 1-D convolution operation.

Thus, as previously described, FFTNet block 220 receives an input tensor 230(1) having a block size dimension of size N and outputs output tensor 230(2) with the corresponding block size dimension of size N/2. A series of FFTNet blocks 220 may be arranged to perform a recursive operation in which an input tensor with block size dimension of N is processed repeatedly until the block size dimension is of size 1.

Figure 2B:
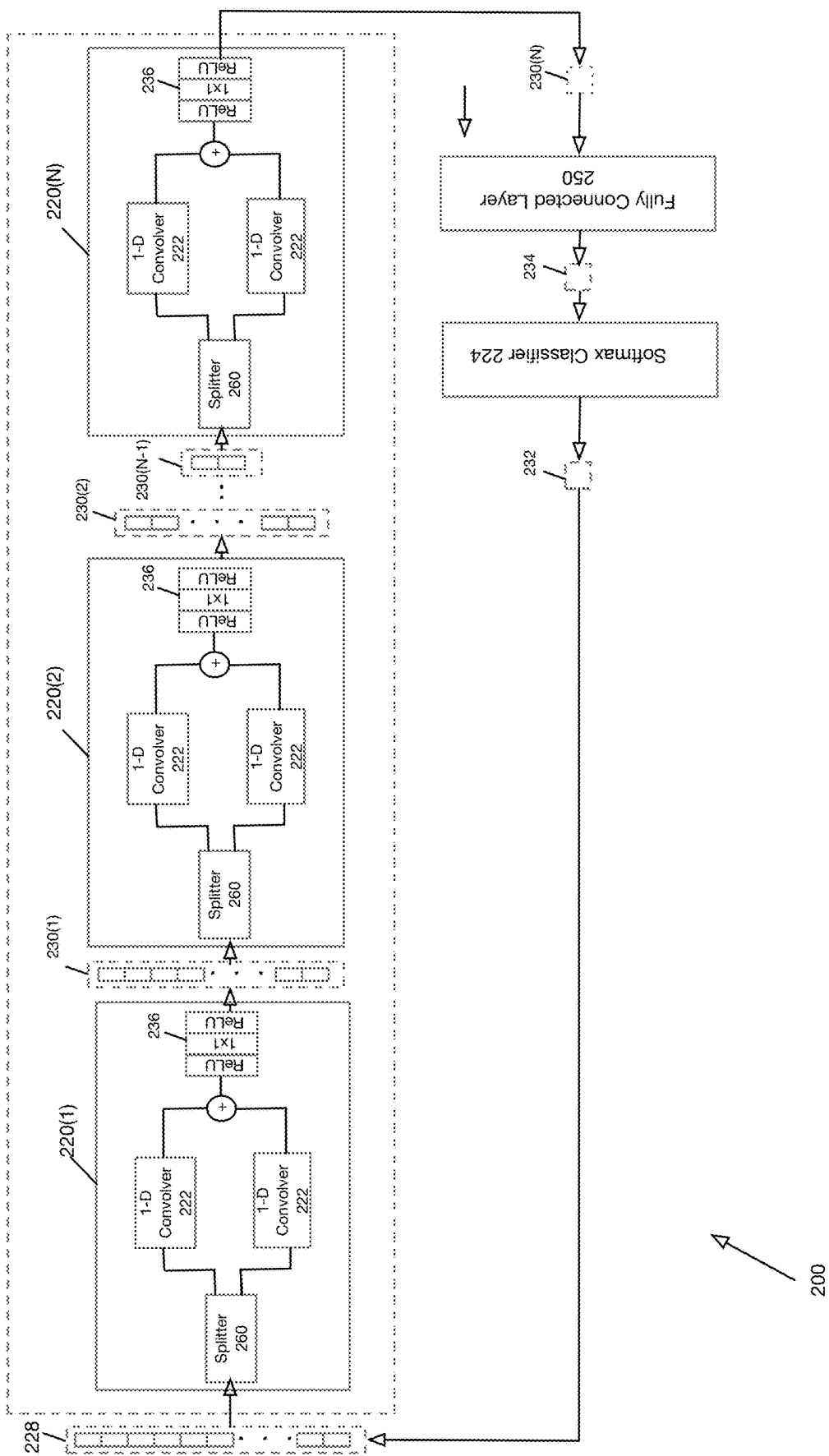
FIG. 2b is a high-level block diagram of an FFTNet according to one embodiment of the present disclosure.

FIG. 2b is a high-level block diagram of an FFTNet according to one embodiment of the present disclosure. FFTNet 200 may be utilized to generate synthetic speech audio samples and according to some embodiments may be utilized in conjunction with a linguistic model and linguistic features that may be utilized as auxiliary information as described above. As shown in FIG. 2b, an FFTNet 200 may further comprise FFTNet blocks 220(1)-220(N), fully connected layer 250 and softmax classifier 224. For clarity, the intermediate results generated by FFTNet blocks 220(1)-220(N) are omitted in FIG. 2b. As shown in FIG. 2b and as previously described with respect to FIG. 2a, each FFTNet block 220(1)-220(N) is a repeatable structure and further comprises splitter 260, first and second 1D convolvers 222 and output block 236, summer 242 and output block 236. Output block 236 further comprises first and second ReLU blocks and 1×1 convolver.

As shown in FIG. 2b, input sample block 228 is provided as input to the FFTNet block. Input sample block 228 may encode a block of audio samples as a tensor of arbitrary dimensionality. According to one embodiment of the present disclosure, and as described below, during inference time, input sample block 228 may be a tensor of the following dimensionality:

[1, BLOCK_SIZE, QUANTIZATION_LEVELS]

where BLOCK_SIZE is the number of samples processed during each iteration and QUANTIZATION_LEVELS is a number of quantization levels for quantizing audio samples. Although, FIG. 2b does not depict the conversion of input sample block 228 into a tensor of the dimensionality described, it will be understood that such a conversion may take place and according to other embodiments any other arbitrary tensor dimension may be utilized to encode input sample block.

FFTNet block 220(1) generates output tensor 230(1), which is then provided as input to FFTNet block 220(2), which generates output tensor 230(2) as previously described with respect to FIG. 2a. A similar operation will occur with respect to each succeeding FFTNet block 220(i). Thus, each FFTNet block 220(i) receives as input the output tensor 230(i−1) of a previous FFTNet block 220(i−1) and generates output tensor 230(i). Final FFTNet block 220(N) receives output tensor 230(N−1) from FFTNet block 220(N−1) (not shown in FIG. 2b) and processes this to generate output tensor 230(N).

Output tensor 230(N) from the final FFTNet block 220(N) is provided to fully connected layer 250, which may comprise a single fully connected layer 250 of artificial neural network nodes. Fully connected layer 250 generates fully connected layer output 234, which is provided to softmax classifier 224. Softmax classifier 224 processes fully connected layer output 234 to generate final output 232, which, according to one embodiment of the present disclosure, may comprise a single audio sample. As shown in FIG. 2b, according to one embodiment of the present disclosure, final output 232 may be provided as input to FFTNet 200 via sample input block 228. That is, as shown in FIG. 2b, according to some embodiments of the present disclosure the output of FFTNet 200 is utilized as input. A method for providing the final output 232 as input to FFTNet 200 is described below As previously described, input/output tensors 230(1)-230(N) of FFTNet blocks 220(1)-220(N), fully connected layer output 234 and softmax classifier output 232 may comprise tensors of a particular dimension. As will be appreciated in the field of deep learning and deep neural networks, a tensor may comprise a multidimensional array. Example tensor dimensions for sample input sample block 228, output tensors 230(1)-230(N), fully connected layer output 234 and final output 232 are described below.

Figure 2C:
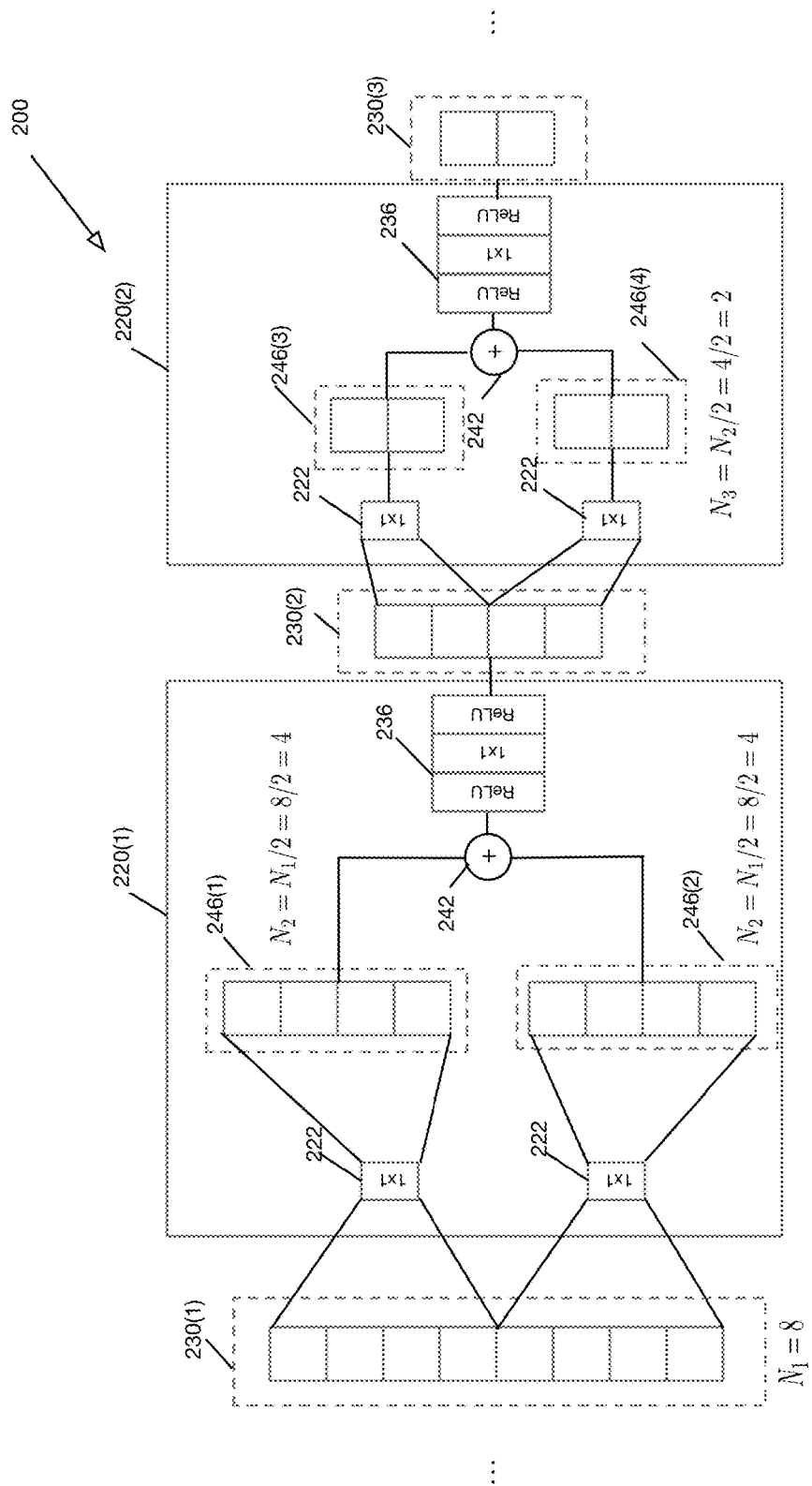
FIG. 2c is a block diagram depicting an operation of a portion of an FFTNet according to one embodiment of the present disclosure.

FIG. 2c is a block diagram depicting an operation of a portion of an FFTNet according to one embodiment of the present disclosure. In particular, FIG. 2c shows the operation of two FFTNet blocks 220(1), 220(2). FIG. 2c does not show fully connected layer 250 or softmax classifier 224. As shown in FIG. 2c, input tensor 230(1) is received by FFTNet block 220(1). Input tensor 230(1) may be a sample block input or may be the output of upstream FFTNet blocks 220(i). In the example depicted in FIG. 2c, input tensor 230(1) has a block size tensor dimension of size 8. Input tensor 230(1) is split into a left tensor and right tensor having a block size dimension of size 4, which are respectively processed by 1-D convolvers 222 to generate left convolved tensor 246(1) and right convolved tensor 246(2). Left and right convolved tensors 246(1)-246(2) are summed by summer 242 to generate a composite tensor (not shown in FIG. 2c), which is then provided to post-processing block 236. Post-processing block 236 performs a first ReLU operation, a 1-D convolution and a second ReLU operation to generate output tensor 230(2), which is provided as input to FFTNet block 220(2).

Similar to the operation of FFTNet block 220(2), input tensor 230(2) is received by FFTNet block 220(2). In this case, input tensor 230(2) has a block size dimension of size 4. Input tensor 230(2) is split into a left tensor and right tensor having a block size dimension of size 2, which are respectively processed by 1-D convolvers 222 to generate left convolved tensor 246(3) and right convolved tensor 246(4). Left and right convolved tensors 246(3)-246(4) are summed by summer 242 and the composite tensor (not shown in FIG. 2c) is then provided to post-processing block 236. Post-processing block 236 performs a first ReLU operation, a 1-D convolution and a second ReLU operation to generate output tensor 230(3), which may be provided as input to additional FFTNet blocks in the chain.

Training

According to one embodiment of the present disclosure, an FFTNet may be trained using backpropagation and gradient descent using an Adam optimizer in conjunction with mini batches. In particular, according to one embodiment of the present disclosure training sets may be generated using audio samples of the same speaker. The acoustic features F0 and MCC are extracted and interpolated to match the audio samples. At training time, batches of size [6, 4000] may be utilized in which 6 utterances are randomly selected. For each utterance, a length of 4000 audio samples is selected together with the corresponding F0 and MFCC as input data. According to one embodiment of the present disclosure, the training data size is [6, 4000] for the audio samples, [6, 4000, 1] for pitch and [6, 4000, 26] for MCC.

Further, according to one embodiment of the present disclosure, 10 FFTNet blocks are utilized, resulting in a receptive field of 2048. To perform efficient training, the split-summation structure of FFTNet is utilized in conjunction with zero-padding Tensor Dimensions According to one embodiment of the present disclosure, an identical operation is applied for each batch at training time. According to one embodiment of the present disclosure, Input sample block 228 may comprise previously generated samples of dimensions [batch_size, 1024, 1] in floating point format, where 1024 is the block size. According to one embodiment of the present disclosure, the input samples are quantized as floating-point data to [batch_size, 1024, 256] (i.e., 256 quantization bins), where the third dimension is the channel dimension of size 256.

For example, assume the utilization of 128 channels. Prior to the application of the first FFTNet block 220, a 1×1 convolver 222 transforms 256 bins into 128 channels:

[batch_size, 1024, 128]

Each FFTNet block 220 reduces the length by a factor of two, so after each FFTNet block the tensor dimensions appear as follow:

[batch_size, 512, 128]
[batch_size, 256, 128]
[batch_size, 128, 128]
. . .
[batch_size, 4, 128]
[batch_size, 2, 128]
[batch_size, 1, 128]

Now, the 2nd dimension can be extracted such that the following tensor dimensions are:

[batch_size, 128]

Fully connected layer 250 may be then be applied. According to one embodiment of the present disclosure, fully connected layer 250 may be equivalent to a 1×1 convolution. Fully connected layer 250 may transform FFTNet Block output into 256 channels because the output is the posterior distribution of 256 quantized value bins.

[batch_size, 256]

The final output (after another fully connected layer) may be of dimension:

[batch_size, 256]

According to one embodiment of the present disclosure, output samples are fed back as input to the FFTNet 200 in input sample block 228. For example, assuming a sample input block 228 of size 1024, [1, 2, 3, . . . , 1024] for input and output sample [1025]. In the next step, the input [2, 3, . . . , 1025] are utilized to produce sample [1026].

According to one embodiment of the present disclosure, softmax classifier 224 may utilize a cross-entropy loss function for training. According to one embodiment of the present disclosure, a loss function may be a cross-entropy loss function. The cross-entropy loss function may be expressed as:

$$E_t(y_t, \hat{y}_t) = -y_t \log \hat{y}_t$$
$$E_t(y, \hat{y}) = \sum_t E_t(y_t, \hat{y}_t) = -\sum_t y_t \log \hat{y}_t$$

where $y_t$ is the target (correct) word at each time step t and $\hat{y}_t$ is the prediction. Typically, the full sequence may be treated as a single training example so that the total error is the sum of errors at each time step.

According to one embodiment of the present disclosure, softmax classifier 224 may be represented as:

$$\sigma: R^K \to [0, 1]^K$$

$$\sigma(z)_j = \frac{e^{z_j}}{\sum_{k=1}^{K} e^{z_k}} \text{ for } j = 1, \ldots, K$$

Effectively, softmax classifier 224 maps a K-dimensional vector k to a K-dimensional vector σ(z) of real values in the range [0, 1] that add up to 1 so that σ(z) exhibits properties of a probability mass function.

Zero Padding

According to one embodiment of the present disclosure, an FFTNet 200 may employ zero-padding, which achieves dilated convolution. In particular, given a sequence of length M, the input $x_{1:M}$ is shifted to the right by N samples with zero padding. The N padded zeros are denoted as $x_{-N:0}$ where $\forall j<0$, $x_j=0$. The equation describing each FFTNet block then becomes:

$$z_{0:M} = W_L * x_{-N:M-N} + W_R * x_{0:M}$$

According to some embodiments, experimental results demonstrate that without zero padding, an FFTNet 200 tends to produce noise or gets stuck (outputting zeros) when the inputs are near silence. Zero-padding during training allows the network to generalize to partial input. According to some embodiments, training sequences of length between 2N and 3N are utilized so that a significant number (33%-50%) of training samples are partial sequences.

Conditional Sampling

As FFTNet 200 includes a softmax classifier 224 as the final processing element, the prediction error comes from two sources: training error and true error. The true error corresponds to noise mostly resides in unvoiced signal. According to one embodiment of the present disclosure, to synthesize noise, an FFTNet 200 may learn the noise's distribution by the output posterior distribution on which random sampling may be employed to obtain the sample's value. Training error comes from the model itself. The prediction strategy that provides the minimal training error is argmax. However, argmax is not suitable for simulating signals that contain true noise, since it always chooses the center of a noise distribution leading to zero noise in the synthesis output. Instead of using argmax universally, according to some embodiment of the present disclosure, different prediction strategies are utilized for unvoiced and voiced sounds. In particular, a different strategy may be employed for voiced and unvoiced sounds.

Figure 3:
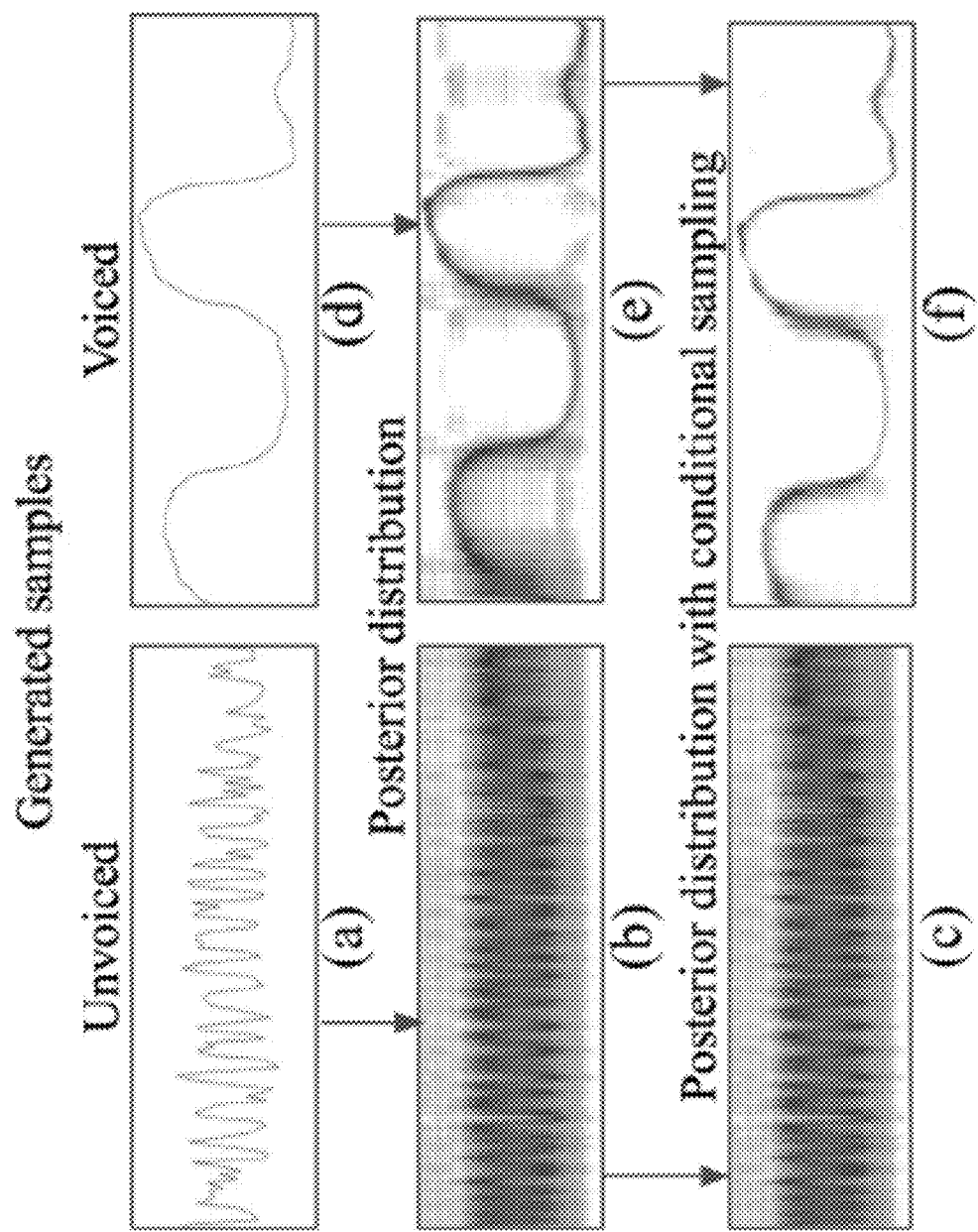
FIG. 3 is a number of plots showing the posterior distribution for conditional sampling based upon voiced and unvoiced sounds according to one embodiment of the present disclosure.

FIG. 3 is a plot showing the posterior distribution for conditional sampling based upon voiced and unvoiced sounds according to one embodiment of the present disclosure. For unvoiced sounds, the posterior distribution is randomly sampled. For voiced sounds, the normalized logits (the input values before softmax classifier 224) is multiplied it by a constant c>1 and passed through softmax classifier 224 to obtain a posterior distribution where random sampling is performed. In this way, the posterior distribution will look steeper while the original noise distribution is preserved. According to one embodiment of the present disclosure the variable c=2 is used.

Injected Noise

Because of training error, the synthesized samples always contain some amount of noise; during synthesis, the network will generate samples that get noisier over time. The output samples serve as network input to generate the next sample, adding more and more randomness to the network. When the noise builds up, the output sample might drift leading to clicking artifacts. According to one embodiment of the present disclosure, to avoid such drift, an FFTNet 220 may be modified to be robust to noisy input samples. In particular, this is achieved by injecting random noise to the input $x_{0,M}$ during training. According to one embodiment of the present disclosure, the amount of noise to inject into the input is based on the amount of noise the network is likely to produce. According to one embodiment of the present disclosure, based upon the observation that the prediction is often one category (out of 256) higher or lower than the ground-truth category Gaussian noise centered at 0 with a standard deviation of $\frac{1}{256}$ (based on 8-bit quantization) is injected.

Post-Synthesis Denoising

Experiments show that injected noise eliminates clicking artifacts almost perfectly for but introduces a small amount of random noise to voiced samples. According to one embodiment of the present disclosure, a spectral subtraction noise reduction is employed to reduce the injected noise for the voice samples. The amount of reduction is proportional to the amount of noise injected during training. It is possible to apply noise reduction to the unvoiced samples too, but it may result in artifacts.

Inference

Once trained, the FFTNet may be utilized in an inferencing application, such as voice synthesis, according to some embodiments.

Tensor Dimensions

According to one embodiment of the present disclosure, at inference time, the above tensor dimensions described with respect to training time are preserved except the batch size is 1.

Experimental Results

According to one embodiment of the present disclosure, four voices, two male (BDL,RMS) and two female (SLT, CLB), from the CMU Arctic dataset were used in experiments. The first 1032 utterances (out of 1132) were used for training and the remaining were used for evaluation. The waveforms were quantized to 256 categorical values based on μ-law. 25-coefficient Mel Cepstral Coefficients (with energy) and F0 were extracted from the original samples.

Four networks were constructed for each voice, 2 WaveNets and 2 FFTNets 200. For each type of network, two training strategies were employed:

Strategy On: Zero Padding Only

Strategy Two Applies All Training Techniques (described above)

For comparison, a WaveNet was implemented containing two stacks of 10-layer dilated convolution (d=20, 21, ..., 29) with 256 dilation and 128 skip channels. The total receptive field was 2048 samples. Varying numbers of channels were tested and an optimal configuration for performing vocoding was determined.

According to one embodiment of the present disclosure, an FFTNet implementation 200 utilizing 11 FFT-layers with 256 channels and a receptive field of 2048 was utilized. Such an FFTNet configuration has less than 1M parameters and with proper caching, the computation cost for generating one second of audio (16 kHz) is approximately 16GFLOPs. This means that a modern CPU could generate audio samples in real-time. In each training step, a minibatch of 5×5000-sample sequences was fed to the network, optimized by Adam algorithm with a training rate of 0.001. The variance of injected noise was set to be $1/256$. In each minibatch, all sequences were determined from different utterances.

A WaveNet was trained using 200,000 steps. A FFTNet was trained with 100,000 steps to ensure convergence. Based upon experiments, synthesis using FFTNet resulted in more than 70 times faster performance than Fast WaveNet, requiring only 0.81 second to generate 1 second of audio on a laptop CPU (2.5 GHz Intel Core i7).

Subjective Evaluation

A Mean Opinion Score (MOS) test that asks subjects to rate the quality of the synthetic utterances was performed. Participants from United States who have an approval rate over 90% were recruited to ensure the reliability of the study results. A validation test to ensure a subject was paying attention was also performed. Six conditions were established for each utterance as follows:

| | |
|---|---|
| MLSA | MLSA Filter |
| WN | WaveNet with only zero-padding |
| FFTN | FFTNet with only zero-padding |
| WN+ | WaveNet with zero padding, conditional sampling, injected noise and post-synthesis denoising |
| FFTN+ | FFTNet with zero padding, conditional sampling, injected noise and post-synthesis denoising |
| Real | Actual recording |

In each task (called a HIT), a subject was presented with 32 different sentences in which 24 of them were composed of 4 instances from each of the above 6 conditions. From a held-out set of sentences, 4 more instances of the "Real" condition and 4 more cases of badly edited "Fake" (3-bit A-law encoded) condition to validate that the subject was paying attention and not guessing randomly were determined. For the data to be retained, the subject was allowed to make at most one mistake on these validation tests, by either rating <3 on "Real" examples or >3 on "Fake" examples. 480 HITs (120 per voice) were launched and 446 after validation were retained.

Figure 4:
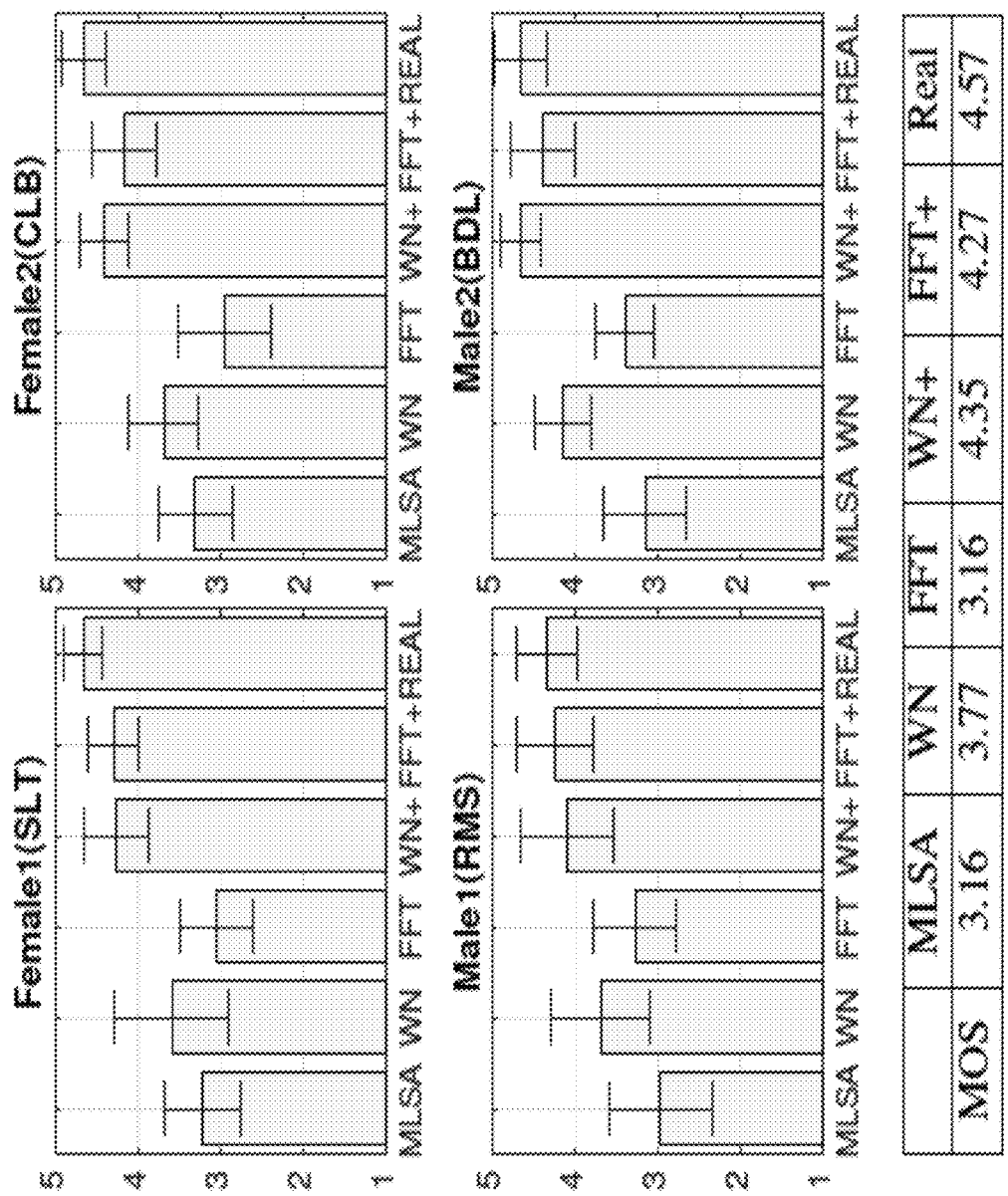
FIG. 4 shows a number of bar charts for the MOS test with an error bar indicating standard deviation across utterances.

FIG. 4 shows a bar chart for the MOS test with an error bar indicating standard deviation across utterances. The proposed training technique improved both WaveNet and FFTNet significantly with an ANOVA test p-value less than 10 9 for both networks. The proposed network FFT+ also improved on WN with a p-value of <10 20. Both WN+ and FFT+ had significant overlap with the real examples in MOS scores. The proposed method FFT+ had a slightly lower MOS than WaveNet WN+(with an insignificant p-value); but it is much faster, as noted above. FFT had a similar quality to the baseline method MLSA (insignificant pvalue) due to noisy artifacts.

Objective Evaluation

A distortion between the original and the synthesized speech using RMSE and MCD was performed. RMSE measures frequency domain difference between two signals; and MCD measures the difference in the cepstral domain, which reflects whether the synthesized speech can capture the characteristics of the original speech. Both measurements are in dB. The result is shown in the following table:

| | MCD (dB) | | | | RMSE (dB) | | | |
|---|---|---|---|---|---|---|---|---|
| voice | slt | clb | rms | bdl | slt | clb | rms | bdl |
| mlsa | 2.76 | 3.03 | 3.62 | 3.28 | 8.05 | 9.14 | 8.80 | 8.25 |
| WN | 4.47 | 4.04 | 4.60 | 3.05 | 9.71 | 9.65 | 9.38 | 8.29 |
| WN+ | 4.57 | 4.13 | 4.41 | 3.28 | 9.80 | 8.95 | 9.74 | 8.67 |
| FFT | 5.24 | 5.07 | 4.82 | 4.23 | 10.39 | 9.77 | 10.33 | 10.13 |
| FFT+ | 4.73 | 4.69 | 4.41 | 3.82 | 9.88 | 9.58 | 9.89 | 9.64 |

The result shows that MLSA tends to preserve most of the cepstral and spectral structure while the MOS test puts it in a significantly lower tier as it generates audible over-smoothing artifacts. The training techniques described above do not reduce distortion in WaveNet, but they significantly improve FFTNet in both metrics. WaveNet with the proposed techniques performs significantly better in subjective evaluation than the one without.

Integration in Computing System and Network Environment

Figure 5A:
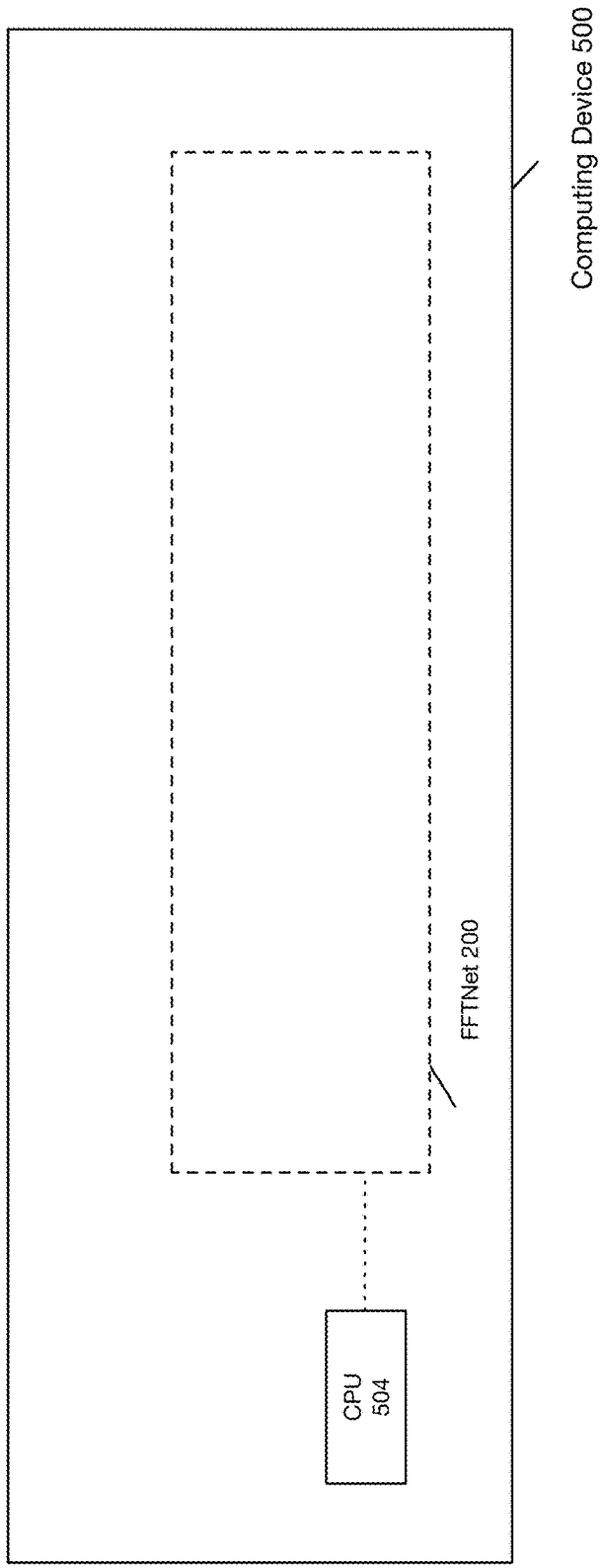
FIG. 5a illustrates an example computing system that executes an FFTNet according to one embodiment of the present disclosure.

FIG. 5a illustrates an example computing system that executes an FFTNet 200 according to one embodiment of the present disclosure. As depicted in FIG. 5a, computing device 500 may include CPU 504 that executes one or more processes to perform FFTNet 200. In particular, CPU 504 may be further configured via programmatic instructions to execute FFTNet 200 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform. According to alternative embodiments CPU 504 may be replaced with a GPU.

Figure 5B:
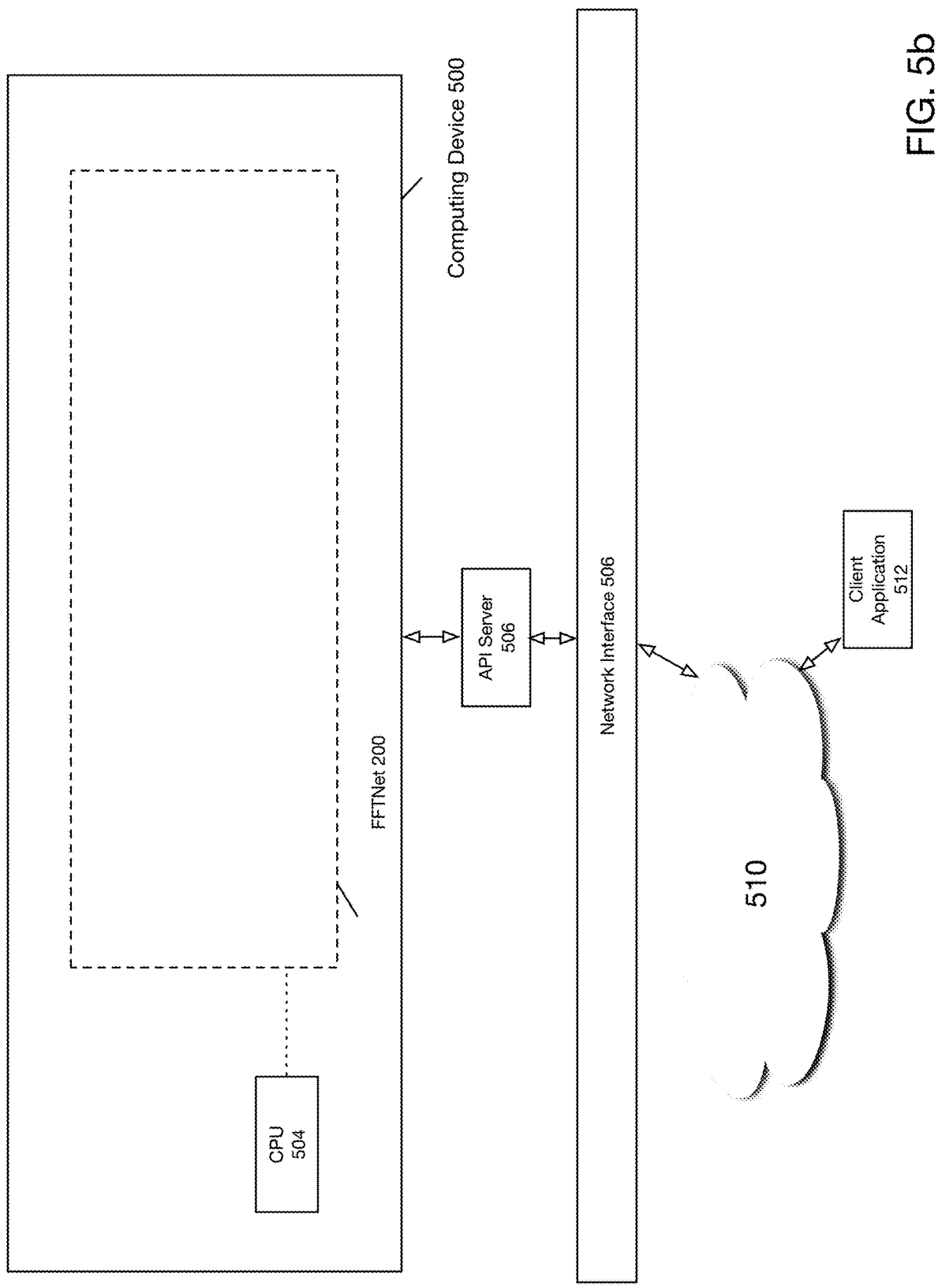
FIG. 5b illustrates an example integration of an FFTNet into a network environment according to one embodiment of the present disclosure.

FIG. 5b illustrates an example integration of an FFTNet 200 into a network environment according to one embodiment of the present disclosure. As depicted in FIG. 5b, computing device 500 may be collocated in a cloud environment, data center, local area network ("LAN") etc. Computing device 500 shown in FIG. 5b is structured identically to the example embodiment described with respect to FIG. 5a. As shown in FIG. 5b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 5a or 65, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for generating speech samples, the method comprising receiving an input tensor, splitting said received input tensor into a first portion and a second portion, performing a 1×1 convolution respectively on said first portion and said second portion to generate a respective first intermediate result and a second intermediate result, summing said first intermediate result and said second intermediate result to generate a third intermediate result, applying a post-processing function on said third intermediate result to generate a fourth intermediate result, computing an output tensor by summing said received input tensor with said fourth intermediate result, recursing by setting said input tensor to said output tensor until said output tensor is of size one in a pre-determined dimension, and, performing a prediction of a speech sample using said output tensor of size one in a pre-determined dimension.

Example 2 includes the subject matter of Example 1, wherein performing a prediction of a speech sample using said output tensor of size one in a pre-determined dimension further comprises processing said output tensor by a fully connected neural network layer to generate a fifth intermediate result, and, applying a softmax classifier to said fifth intermediate result to generate a speech sample.

Example 3 includes the subject matter of Example 1 or 2, wherein said input tensor comprises a one-hot vector comprising a plurality of channels, wherein each channel is set to 0 except for a single channel corresponding to a quantization value of an audio signal.

Example 4 includes the subject matter of Example 1, 2 or 3 wherein said post-processing function comprises a first non-linear activation function followed by a 1×1 convolution followed by a second non-linear activation function.

Example 5 includes the subject matter of Example 4, wherein said first and second non-linear activation functions are ReLU ("Rectified Linear Unit") activation functions.

Example 6 includes the subject matter of Example 1, 2, 3, 4 or 5 further comprising during a training operation performing a zero-padding operation.

Example 7 includes the subject matter of Example 6, wherein said zero-padding operation comprises shifting said input tensor to the right by N samples, wherein said N samples are set to 0.

Example 8 is a system for generating speech samples comprising a plurality of FFTNet blocks arranged in series, wherein each FFTNet block includes a splitter module, a convolution module, a summation block, and a post-processing module, wherein said post-processing module generates an output based upon said composite tensor, a fully connected layer, wherein said fully connected layer is coupled to a last FFTNet block in said series; and, a softmax classifier coupled to an output of said fully connected layer.

Example 9 includes the subject matter of Example 8, wherein said post-processing module comprises a first activation function block followed by a 1×1 convolution block followed by a second activation block.

Example 10 includes the subject matter of Example 9, wherein said first and second activation blocks implement a ReLU activation function.

Example 11 includes the subject matter of Example 8, wherein said convolution module performs a 1×1 convolution.

Example 12 includes the subject matter of Example 8, wherein said splitter module splits an input tensor into a left tensor and a right tensor;

Example 13 includes the subject matter of Example 12 wherein said convolution module performs a convolution upon said left tensor and said right tensor to generate a respective convolved left tensor and a convolved right tensor.

Example 14 includes the subject matter of Example 13, wherein said summation block generates a composite tensor based upon the convolved left tensor and the convolved right tensor.

Example 15 is a computer program product including one or more non-transitory machine-readable mediums encoded with instructions that when executed by one or more processors cause a process to be carried out for generating speech samples, the process comprising receiving an input tensor, splitting said received input tensor into a first portion and a second portion, performing a 1×1 convolution respectively on said first portion and said second portion to generate a respective first intermediate result and a second intermediate result, summing said first intermediate result and said second intermediate result to generate a third intermediate result, applying a post-processing function on said third intermediate result to generate a fourth intermediate result, computing an output tensor by summing said received input tensor with said fourth intermediate result, recursing by setting said input tensor to said output tensor until said output tensor is of size one in a pre-determined dimension, and, performing a prediction of a speech sample using said output tensor of size one in a pre-determined dimension.

Example 16 includes the subject matter of Example 15, wherein performing a prediction of a speech sample using said output tensor of size one in a pre-determined dimension further comprises processing said output tensor by a fully connected neural network layer to generate a fifth intermediate result, and, applying a softmax classifier to said fifth intermediate result to generate a speech sample.

Example 17 includes the subject matter of Example 15 or 16, wherein said input tensor comprises a one-hot vector comprising a plurality of channels, wherein each channel is set to 0 except for a single channel corresponding to a quantization value of an audio signal.

Example 18 includes the subject matter of Example 15, 16, 17 or 18 wherein said post-processing function comprises a first non-linear activation function followed by a 1×1 convolution followed by a second non-linear activation function.

Example 19 includes the subject matter of Example 18, wherein said first and second non-linear activation functions are ReLU ("Rectified Linear Unit") activation functions.

Example 20 includes the subject matter of Example 15, 16, 17, 18 or 19 further comprising during a training operation performing a zero-padding operation.

What is claimed is:

1. A method for generating speech samples, the method comprising:
   receiving an input tensor;
   splitting said received input tensor into a first portion and a second portion;
   performing a 1×1 convolution respectively on said first portion and said second portion to generate a respective first intermediate result and a second intermediate result;
   summing said first intermediate result and said second intermediate result to generate a third intermediate result;
   applying a post-processing function on said third intermediate result to generate a fourth intermediate result;
   computing an output tensor by summing said received input tensor with said fourth intermediate result;
   recursing by setting said input tensor to said output tensor until said output tensor is of size one in a pre-determined dimension; and,
   performing a prediction of a speech sample using said output tensor of size one in a pre-determined dimension.

2. The method according to claim 1, wherein performing a prediction of a speech sample using said output tensor of size one in a pre-determined dimension further comprises:
   processing said output tensor by a fully connected neural network layer to generate a fifth intermediate result; and,
   applying a softmax classifier to said fifth intermediate result to generate a speech sample.

3. The method according to claim 1, wherein said input tensor comprises a one-hot vector comprising a plurality of channels, wherein each channel is set to 0 except for a single channel corresponding to a quantization value of an audio signal.

4. The method according to claim 1, wherein said post-processing function comprises a first non-linear activation function followed by a 1×1 convolution followed by a second non-linear activation function.

5. The method according to claim 4, wherein said first and second non-linear activation functions are ReLU ("Rectified Linear Unit") activation functions.

6. The method according to claim 1, further comprising during a training operation performing a zero-padding operation.

7. The method according to claim 6, wherein said zero-padding operation comprises shifting said input tensor to the right by N samples, wherein said N samples are set to 0.

8. A system for generating speech samples comprising:
   a plurality of FFTNet blocks arranged in series, wherein each FFTNet block includes
      a splitter module that splits an input tensor into left and right tensors,
      a convolution module that performs a convolution upon said left and right tensors to generate respective convolved left and right tensors,
      a summation block that generates a composite tensor based on the convolved left and right tensors, and
      a post-processing module, wherein said post-processing module generates an output tensor based upon said composite tensor, and wherein said plurality of FFTNet blocks recurse by setting said input tensor of one of said FFTNet blocks to said output tensor of another of said FFTNet blocks;
   a fully connected layer, wherein said fully connected layer is coupled to a last FFTNet block in said series; and,
   a softmax classifier coupled to an output of said fully connected layer.

9. The system according to claim 8, wherein said post-processing module comprises a first activation function block followed by a 1×1 convolution block followed by a second activation block.

10. The system according to claim 9, wherein said first and second activation blocks implement a ReLU activation function.

11. The system according to claim 8, wherein said convolution module performs a 1×1 convolution.

12. A computer program product including one or more non-transitory machine-readable mediums encoded with instructions that when executed by one or more processors cause a process to be carried out for generating speech samples, the process comprising:
   receiving an input tensor;
   splitting said received input tensor into a first portion and a second portion;

performing a 1×1 convolution respectively on said first portion and said second portion to generate a respective first intermediate result and a second intermediate result;

summing said first intermediate result and said second intermediate result to generate a third intermediate result;

applying a post-processing function on said third intermediate result to generate a fourth intermediate result;

computing an output tensor by summing said received input tensor with said fourth intermediate result;

recursing by setting said input tensor to said output tensor until said output tensor is of size one in a pre-determined dimension; and, performing a prediction of a speech sample using said output tensor of size one in a pre-determined dimension.

13. The computer program product according to claim 12, wherein performing a prediction of a speech sample using said output tensor of size one in a pre-determined dimension further comprises:

processing said output tensor by a fully connected neural network layer to generate a fifth intermediate result; and, applying a softmax classifier to said fifth intermediate result to generate a speech sample.

14. The computer program product according to claim 12, wherein said input tensor comprises a one-hot vector comprising a plurality of channels, wherein each channel is set to 0 except for a single channel corresponding to a quantization value of an audio signal.

15. The computer program product according to claim 12, wherein said post-processing function comprises a first non-linear activation function followed by a 1×1 convolution followed by a second non-linear activation function.

16. The computer program product according to claim 15, wherein said first and second non-linear activation functions are ReLU ("Rectified Linear Unit") activation functions.

17. The computer program product according to claim 12, further comprising during a training operation performing a zero-padding operation.

* * * * *